United States Patent [19]
Holden

[11] Patent Number: 5,533,076
[45] Date of Patent: Jul. 2, 1996

[54] CONTROL ROD ABSORBER TUBE WITH INTERFERENCE FIT AND VISCOUS DAMPENING BETWEEN THE END PLUG AND ABSORBER ROD

[75] Inventor: James E. Holden, Wilmington, N.C.

[73] Assignee: General Electric Company, Schenectady, N.Y.

[21] Appl. No.: 488,836

[22] Filed: Jun. 9, 1995

[51] Int. Cl.$^6$ ..................................... G21C 7/10
[52] U.S. Cl. .......................... 376/327; 376/234
[58] Field of Search .................. 376/219, 234, 376/327, 333, 451

[56] References Cited

U.S. PATENT DOCUMENTS 4,853,176  8/1989  Charnley et al. ............... 376/327
4,874,574  10/1989  Igarashi et al. ............... 376/327
5,141,711  8/1992  Gjertsen et al. ............... 376/327

Primary Examiner—Daniel D. Wasil
Attorney, Agent, or Firm—Nixon & Vanderhye

[57] ABSTRACT

A neutron-absorber control rod tube includes end plugs welded at opposite ends to the tube with each end plug having a bore opening into the interior of the tube. A hafnium rod is disposed inside the absorber tube and has reduced diameter end portions providing an interference fit with the bores of the end plugs. The end faces of the hafnium rod terminate short of the inner end faces of the bores of the end plugs defining gas pockets therebetween. The interference fits between the bores of the end plugs and hafnium rod, respectively, afford substantial frictional resistance to relative movement of the end plugs and absorber rod, while the gas pockets provide a viscous dampening effect upon relative movement of the end plugs and absorber rod, in response to acceleration or deceleration loads on the structure in an axial direction of the absorber tube and the absorber rod.

9 Claims, 3 Drawing Sheets

CONTROL ROD ABSORBER TUBE WITH INTERFERENCE FIT AND VISCOUS DAMPENING BETWEEN THE END PLUG AND ABSORBER ROD

TECHNICAL FIELD

The present invention relates to a control rod for a nuclear reactor and particularly relates to a neutron-absorbing section of the control rod having a neutron-absorbing rod and end plugs within an absorber tube arranged to accommodate high acceleration and deceleration loadings on the control rod.

BACKGROUND

Control rods for a nuclear reactor are generally cruciform in shape, with each wing of the control rod containing neutron-absorbing material. One such material is hafnium. The hafnium rod is typically disposed within an absorber tube and connected to a stainless steel plug at one end of the absorber rod, the plug being welded to the end of the absorber tube. The end plug has a projecting male threaded portion with a thread relief between the plug head and the male threads. The complementary end of the hafnium absorber rod about the female threads has a bore provided with female threads for threadedly receiving the male threaded portion of the end plug. Typically, the annulus about the end of the hafnium rod is provided with a lateral opening or cross-hole whereby the end plug portion screwed into the hafnium rod can be staked in place. The opposite end of the hafnium rod is otherwise unsecured to the absorber tube and is spaced from the opposite end plug of the tube to provide a gap allowing for high dynamic loads due to rapid acceleration/deceleration.

It will be appreciated that the control rods can be subjected to very high acceleration/deceleration loads, e.g., during a failed buffer scram event. Such loadings may be up to 166 inches per second. These high acceleration/deceleration loads may cause a failure in the absorber tube and particularly in the connection between the hafnium rod and the end plug. Four areas of the connection are particularly highly stressed and therefore subject to failure during such loadings: (1) the male threads on the end plugs; (2) the female threads on the hafnium rod end; (3) the thread relief on the end plug; and (4) the thin walls of the annulus about the threaded bore and bore extension in the hafnium rod. Consequently, these high acceleration/deceleration forces can fracture the connection between the hafnium rod and the absorber tube through the end plug at various locations. The potential for fracture in these high stress areas will be particularly appreciated when it is recognized that the thread relief between the plug head and threads is 0.100 inch in diameter. Also, when the hafnium rod is drilled to receive the end plug threads, the resulting annulus cross-section is 0.034 inch thick. The annulus is additionally weakened in the area of the stake hole which is 0.06 inches in diameter. Consequently, large accelerations/decelerations may cause a fracture at the connection of the hafnium absorber rod and the end plug.

DISCLOSURE OF THE INVENTION

In accordance with the present invention, the joint between the absorber rod and the end plug is provided with an interference fit affording initial resistance to high acceleration and deceleration loads and subsequent friction/viscous damping between the absorber rod and the end plug in the event of relative motion between the parts thereby reducing the stress on the end plug, the absorber rod and other joints of the control rod. Particularly, the end plug is provided with an axial bore opening at its inner end into the interior of the absorber tube. The absorber rod, preferably formed of hafnium, has a reduced diameter end portion receivable in an interference fit in the bore of the end plug. A gas pocket is formed in the space between the end face of the hafnium rod and the base of the bore. As a consequence, in the event of high acceleration/deceleration, substantial frictional forces due to the interference fit will initially resist relative axial motion between the absorber rod and the end plug. Once the dynamic forces overcome the frictional forces, relative movement between the absorber rod and the end plug will be restricted by the viscous dampening effect of the trapped gas pocket between the absorber rod and each end plug. By enabling the absorber rod to move, but controlling the amount and rate of movement, the stress on the end plug, the absorber rod and other structural joints in the control rod will be substantially reduced.

In a preferred embodiment according to the present invention, there is provided a joint structure for neutron-absorbing material of a control rod for a nuclear reactor, comprising an elongated absorber tube, an absorber rod disposed within the absorber tube and formed of a neutron-absorbing material, an end plug at one end of the absorber tube and having a bore opening into the interior of the tube, the absorber rod having an end portion received within the end plug bore in an interference fit therebetween, the absorber rod having an end face spaced from a base of the bore to define a gas pocket within the bore, the interference fit between the bore and the end portion affording substantial frictional resistance to relative movement of the end plug and the absorber rod, and the gas pocket providing a viscous dampening effect upon relative movement of the end plug and the absorber rod, in response to acceleration or deceleration loads on the joint structure in an axial direction of the absorber tube and the absorber rod.

Accordingly, it is a primary object of the present invention to provide, as part of a control rod for a nuclear reactor, a novel and improved joint between a neutron-absorber rod and an end plug of an absorber rod tube which will substantially minimize stresses on the supporting structure, the end plugs and absorber rod through frictional and viscous dampening effects in the event of high acceleration/deceleration loads on the control rod.

BEST MODE FOR CARRYING OUT THE INVENTION

Figure 1:
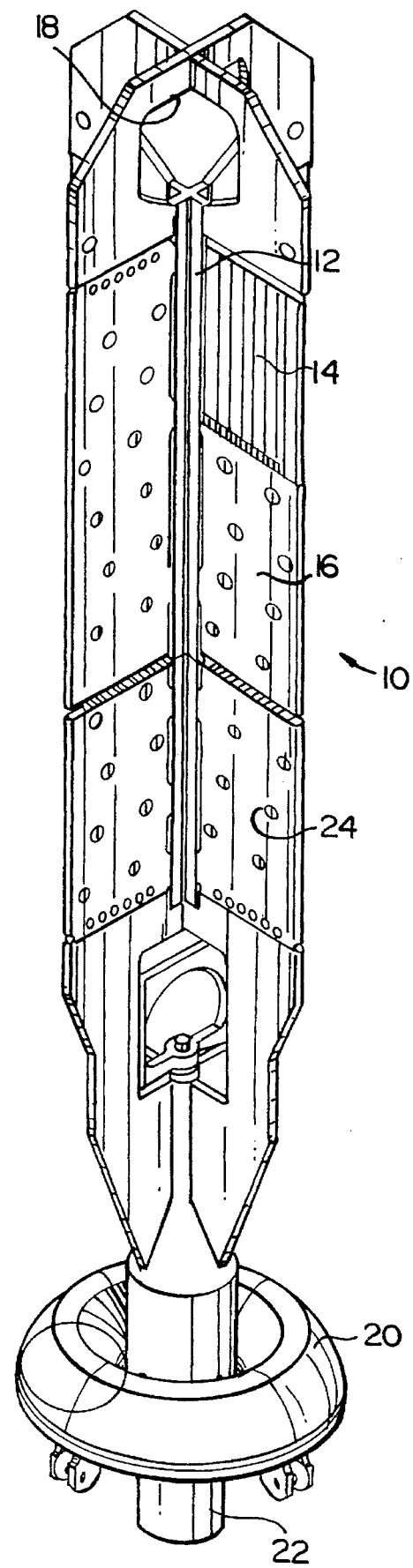
FIG. 1 is a perspective view of a control rod for a nuclear reactor according to the prior art.

Referring now to FIG. 1, there is illustrated a representative example of a control rod, generally designated 10, according to the prior art. The control rod includes a generally cruciform-shaped, vertically extending central tie rod 12 and four wings which form continuations of the cruciform shape of the central tie rod 12. Each of the wings contains a plurality of tubes 14 containing neutron-absorbing material. The tubes are seal-welded with end plugs on either end. For those tubes filled with boron carbide, the tubes act as pressure vessels to contain helium gas released by the boron-neutron capture reaction. Other tubes may contain a neutron-absorbing hafnium rod secured to an end plug. The tubes are held in each wing by a stainless steel sheath 16 extending the full length of the tubes with the inner edges of the sheath secured by welding to the cruciform-shaped tie rod 12, the outer edge being wrapped around the outer tube. One or more hafnium tubes may also be employed in conjunction with the boron carbide-containing tubes 14. A handle 18 is provided at the upper end of the control rod, while a velocity limiter 20 and a coupling socket 22 are provided adjacent its lower end.

As those of skill in this art will appreciate, the control rod is disposed between fuel bundles arranged to have interstices in a generally cruciform shape complementary to the shape of the control rod. By vertically manipulating the control rod, the power distribution, shaping and reactivity control of the reactor can be accomplished. In the illustrated prior control rod of FIG. 1, perforations 24 are provided in the external sheathing 16 around the control rod to permit a cooling medium to flow in and about the neutron absorber tubes. Additionally, the tubes may be formed of all boron carbide or all hafnium rods or combinations of boron carbide and hafnium tubes, depending upon the circumstances of the reactor.

Figure 2:
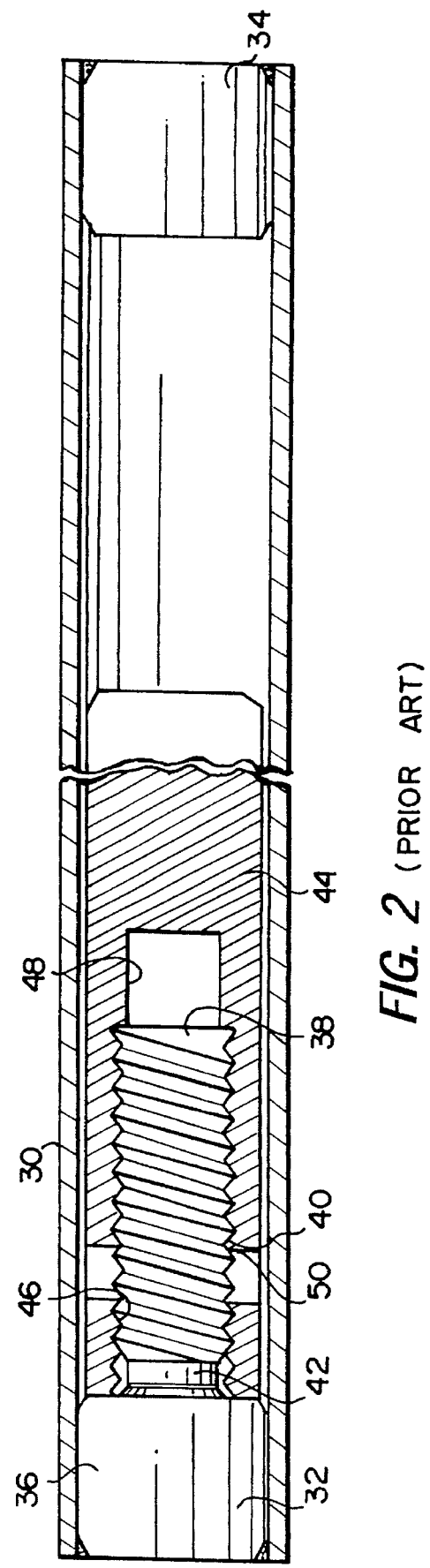
FIG. 2 is an enlarged cross-sectional view of an absorber tube, end plug and absorber rod illustrating the joints therebetween according to the prior art.

Referring now to FIG. 2, the absorber tubes 14 according to the prior art each comprise an elongated tube 30 having end plugs 32 and 34 at opposite ends. End plug 32 includes a generally circular head 36 and a portion 38 projecting from the head 36. The projecting portion 38 has male threads 40 and a thread relief section 42 between the head 36 and the threaded portion of the shaft 38.

The absorber rod 44, preferably formed of a neutron-absorbing material such as hafnium, extends substantially the full length of the tube 30 but is secured only at one end to the end plug 32. At the opposite end, the end of the rod is spaced from the opposite end plug 34 whereby the hafnium rod is connected only to one end of the absorber tube 30. To effect the connection between the hafnium rod and the end plug according to the prior art design, the end of the hafnium tube opposite end plug 36 is bored and tapped to provide a bore having female threads 46 for threaded engagement with the male threads 40 of the end plug 32. The end of the hafnium rod 44 is also counterbored at 48. A laterally extending or cross-bore 40 is also provided adjacent the end of the rod 44 affording a staking hole whereby, once the hafnium rod is threaded to the end plug 32, the threads may be interrupted in the staking hole 50 to ensure the threaded engagement between the hafnium rod and the end plug 32.

It will be appreciated from a review of FIG. 2, particularly recognizing the dimensions of the various parts as previously given, that four potential fracture areas can be identified, namely, the male threads 40, the female threads 46, the thread relief area 42 of the end plug 32 and the annulus about the bore of the hafnium rod, particularly in the area of the staking hole which further reduces the amount of material remaining to secure the joint. When such joint is subjected to high acceleration or deceleration loads, for example, in the event of a buffer scram, the fracture of the joint may occur at one or more of those stressed areas.

Figure 3:
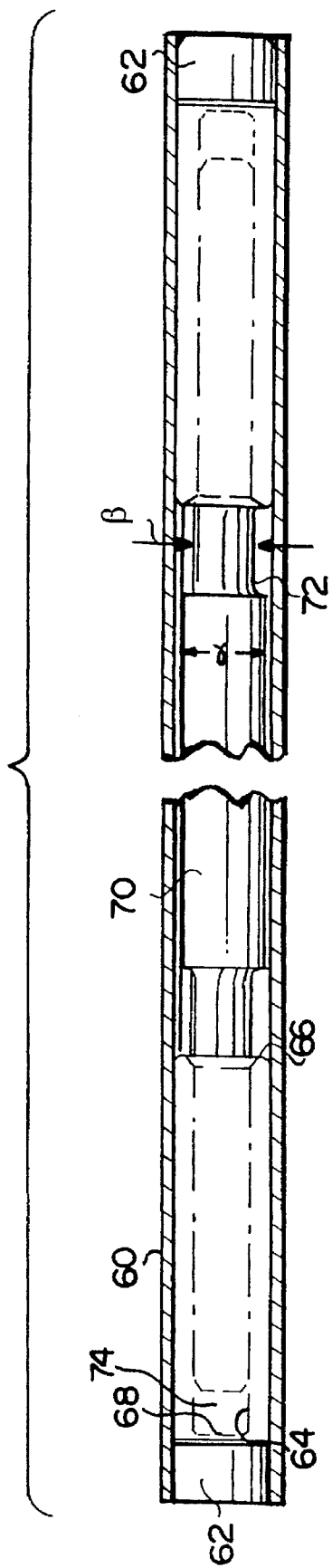
FIG. 3 is a cross-sectional view of an absorber tube, end plug and absorber rod according to the present invention.
Figure 4:
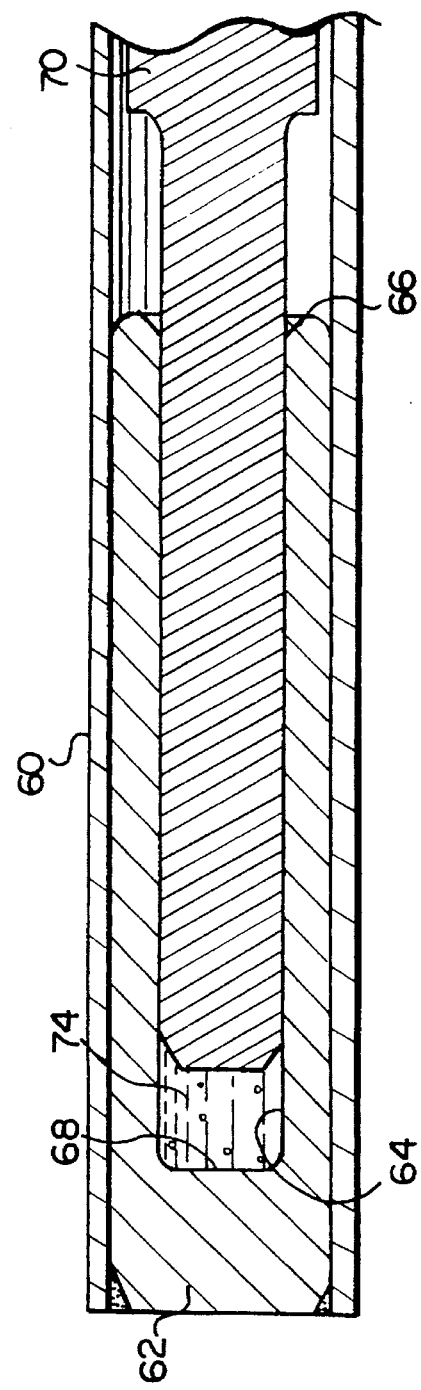
FIG. 4 is an enlarged cross-sectional view of the joint between the absorber rod and end plug at one end of the absorber tube.

To avoid the potential for stress fracture due to high acceleration/declaration loads, the present invention provides a novel and improved joint as illustrated in FIGS. 3 and 4. In FIG. 3, the cylindrical absorber tube 60 has a pair of end plugs 62 at its opposite ends. The plugs are identical to one another and, consequently, a description of one will suffice as a description of the other. Each end plug 62 is welded to the corresponding end of the absorber tube 60 and includes an axially extending bore 64 opening through the inner end face 66 of the end plug 62. The inner end face 68 of the bore 64, of course, terminates short of the external end face of plug 62.

The hafnium rod 70 disposed within the absorber tube 60 comprises an elongated rod having a predetermined diameter $\alpha$ affording a small clearance between the outer surface of the central portion of the hafnium rod and the inner wall of tube 60. The opposite end portions 72 of the hafnium rod are reduced in diameter to a diameter $\beta$ smaller than the diameter $\alpha$. The diameters of the reduced end portions 72 of the hafnium rod 70 and the bores 64 are selected to provide a radial clearance between the end portions of the absorber rod and the diameter of the end plug bores in a range from 0.001 diametral interference to 0.001 diametral clearance. Consequently, a tight interference fit is provided between the end portions of the hafnium rod 70 and the bores of the end plugs 62, effectively locating the hafnium rods within the absorber tube 60. As will be appreciated from a review of FIG. 3, the hafnium rod has a length shorter than the distance between the inner end faces 68 of the end plugs 62. Consequently, when the hafnium rod is located in the absorber tube 60, the end faces of the hafnium rods terminate short of the end faces 68 of the end plug bores forming gas pockets 74 between the rod end faces and the inner bore end faces.

As a consequence of this construction, when the control rod and the absorber rods and tubes carried thereby are subjected to high accelerations or decelerations, the interference fits between the reduced diameter end portions of the hafnium rod and the bores 64 of the end plugs 62 afford substantial frictional resistance to relative movement between the end plugs and the hafnium rod. Should that frictional resistance be overcome by the dynamic forces of acceleration or deceleration, the gas pockets provide a viscous dampening effect upon relative movement of the end plugs and hafnium rods. Consequently, by allowing the absorber rod to move relative to the end plugs after the frictional resistance of the interference fits is overcome and controlling the magnitude of the movement and the rate of the movement, the stresses on the end plug, the absorber rod and other structural joints in the control rod are substantially reduced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Joint structure for neutron-absorbing material of a control rod for a nuclear reactor, comprising:

an elongated absorber tube;

an absorber rod disposed within said absorber tube and formed of a neutron-absorbing material;

an end plug at one end of said absorber tube and having a bore opening into the interior of said tube;

said absorber rod having an end portion received within said end plug bore in an interference fit therebetween, said absorber rod having an end face spaced from a base of said bore to define a gas pocket within said bore, the interference fit between said bore and said end portion affording substantial frictional resistance to relative movement of said end plug and said absorber rod, and said gas pocket providing a viscous dampening effect upon relative movement of said end plug and said absorber rod, in response to acceleration or deceleration loads on said joint structure in an axial direction of said absorber tube and said absorber rod.

2. A joint structure according to claim 1 wherein a radial clearance between said end portion of the absorber rod and the diameter of the end plug bore ranges from 0.001 diametral interference to 0.001 diametral clearance.

3. A joint structure according to claim 1 including a second end plug at the opposite end of said tube and having a second bore opening into the interior of said absorber tube, said absorber rod having a second opposite end portion received within said second end plug bore in an interference fit therebetween, said absorber rod having a second end face spaced from a base of said second bore to define a gas pocket within said second bore, the interference fit between said second bore and said second end portion affording substantial frictional resistance to relative movement of said second end plug and said absorber rod and said second gas pocket providing a viscous dampening effect upon relative movement of said second end plug and said absorber rod, in response to acceleration or deceleration loads on said joint structure in an axial direction of said absorber tube and said absorber rod.

4. A joint structure according to claim 3 wherein a radial clearance between the second opposite end portion of the absorber rod and the diameter of the second end plug bore ranges from 0.001 diametral interference to 0.001 diametral clearance.

5. A joint structure according to claim 1 wherein said end plug is welded to said absorber tube.

6. A joint structure according to claim 1 wherein said absorber rod has a predetermined diameter within said absorber tube, said end portion of said absorber rod having a diameter reduced from said predetermined diameter of said absorber rod.

7. A joint structure according to claim 1 including a second end plug at the opposite end of said tube and having a second bore opening into the interior of said absorber tube, said absorber rod having a second opposite end portion received within said second end plug bore in an interference fit therebetween, said absorber rod having a second end face spaced from a base of said second bore to define a gas pocket within said second bore, the interference fit between said second bore and said second end portion affording substantial frictional resistance to relative movement of said second end plug and said absorber rod, and said second gas pocket providing a viscous dampening effect upon relative movement of said second end plug and said absorber rod, in response to acceleration or deceleration loads on said joint structure in an axial direction of said absorber tube and said absorber rod, said end plugs being welded to the respective opposite ends of said absorber tube.

8. A joint structure according to claim 1 including a second end plug at the opposite end of said tube and having a second bore opening into the interior of said absorber tube, said absorber rod having a second opposite end portion received within said second end plug bore in an interference fit therebetween, said absorber rod having a second end face spaced from a base of said second bore to define a gas pocket within said second bore, the interference fit between said second bore and said second end portion affording substantial frictional resistance to relative movement of said second end plug and said absorber rod, and said second gas pocket providing a viscous dampening effect upon relative movement of said second end plug and said absorber rod, in response to acceleration or deceleration loads on said joint structure in an axial direction of said absorber tube and said absorber rod, said absorber rod having a predetermined diameter within said absorber tube between the end plugs at opposite ends of said tube, said end portions of said absorber rod having diameters reduced from said predetermined diameter.

9. A joint structure according to claim 8 wherein a radial clearance between each of the opposite end portions of said absorber rod and the diameter of the respective end plug bores ranges from 0.001 diametral interference to 0.001 diametral clearance.

* * * * *